United States Patent [19]
Santos et al.

[11] Patent Number: 5,761,460
[45] Date of Patent: Jun. 2, 1998

[54] RECONFIGURABLE DUAL MASTER IDE INTERFACE

[75] Inventors: Gregory N. Santos, Cypress; David J. Maguire; William C. Hallowell, both of Spring, all of Tex.; James R. Edwards, Longmont, Colo.

[73] Assignee: Compaq Computer Corporation, Houston, Tex.

[21] Appl. No.: 684,490

[22] Filed: Jul. 19, 1996

[51] Int. Cl.⁶ .................................................. G06F 13/00
[52] U.S. Cl. ......................... 395/309; 395/882; 395/828
[58] Field of Search .................................. 395/882, 306, 395/281, 309, 828

[56] References Cited

U.S. PATENT DOCUMENTS

| | | | |
|---|---|---|---|
| 5,649,233 | 7/1997 | Chen | 395/808 |
| 5,671,366 | 9/1997 | Niwa et al. | 395/281 |

OTHER PUBLICATIONS

Western Digital, Enhanced IDE 95/96 Guide, Version 0.95, pp. i–vi, 1–17, Mar. 17, 1995.
intel® 82371FB PCI ISA IDE Xcelerator (PIIX), pp. 62–79, Jun. 1995.
EDN Design Feature, New Peripheral Interfaces: Fast & Full of Features, pp. 69–81, Oct. 12, 1995.
Portable Design, Hang on! Here's another approach to hot docking, pp. 19–20, Jul. 1996.
Plug and Play BIOS Specification, Version 1.0A, pp. 1–79, Mar. 10, 1994.

*Primary Examiner*—Jack B. Harvey
*Assistant Examiner*—David A. Wiley
*Attorney, Agent, or Firm*—Pravel, Hewitt, Kimball & Krieger

[57] ABSTRACT

A dual-master data storage interface is disclosed which flexibly configures and connects data storage drives in the portable computer to optimize performance when the portable computer is operating in a stand-alone mode and to optimize accessibility to additional data storage drives when the portable computer is docked with an expansion unit. When the portable computer operates as a stand-alone unit (i.e., not docked to the expansion unit), each drive on the portable is configured to operate as a master drive to optimize performance. When the portable computer docks with the expansion unit, the first channel on the portable computer is connected via switches to both drives of the portable computer, while the second channel on the portable computer is disconnected. Further, the first data storage drive is configured as a master and the second data storage drive is configured as a slave drive on the portable computer side. Correspondingly, the drives located on the expansion base unit are reconfigured and remapped as master and slave drives on the second channel on the expansion base unit, while the first channel on the expansion base unit is disconnected.

22 Claims, 11 Drawing Sheets

RECONFIGURABLE DUAL MASTER IDE INTERFACE

BACKGROUND OF THE INVENTION

1. Field of the Invention

The present invention relates generally to a computer interface, and more particularly, to a computer interface which reconfigurably supports dual master devices.

2. Description of the Related Art

The proliferation of personal computers is driven in part by the ever increasing availability and accessibility of computers as provided by the plethora of models ranging from desktop to portable computers. Today's light-weight, yet powerful mobile computers such as portables, luggables, laptops, notebooks, palmtops and personal digital assistants provide the processing capability necessary for compute-intensive applications such as computer aided design (CAD), three-dimensional animation, and multimedia when users are at remote locations. Multimedia refers to the integration of text, audio, graphics, still image, and moving pictures into a single computer-controlled product and includes the combination of computers, video or compact disc players, video monitors, optical scanners, audio cards, music synthesizers, etc., all integrated through software. These applications typically require the portable computer to support a large capacity disk drive and a CD-ROM (Compact Disk Read-Only-Memory) player on-board. Further, certain applications require custom circuitry which is provided via expansion boards that plug into the portable's expansion slots. Due to weight, space and power consumption limits imposed by the physical structure of the portable computer, the portable computer is limited in terms of expandability because it can only offer a limited number of expansion slots. These slots typically conform to a standardized input/output (I/O) bus such as the Industry Standard Architecture (ISA) bus, the Extended Industry Standard Architecture (EISA) bus, and the Peripheral Component Interconnect (PCI) bus.

Although weight and compactness are desirable attributes for the mobile computing market, users also desire access to both additional peripherals and additional storage capacity when they are not traveling. One method of providing expandability for portable computers without sacrificing size, weight and power consumption is through the use of an expansion base unit. Such an expansion base unit provides expansion capability in a non-portable unit that operates from AC power and resides on the user's desktop. The user simply plugs the portable computer into the expansion base unit to access the additional functionality that is typically available to desktop computers. For example, the expansion base unit could have a network interface card (NIC) for connecting to a local area network, a large capacity disk drive for additional data storage, and additional expansion cards. However, the use of an expansion base unit may create addressing conflicts between devices on the portable computer and devices on the expansion base unit.

A component of the computer system that is potentially affected by such an addressing conflict is the data storage system that could include a disk drive, a tape drive or a CD-ROM player, among others. Typically, an IBM PC compatible computer controls the disk drive and the CD-ROM player via an Intelligent Drive Electronics (IDE) interface. IDE drives were originally developed to be software compatible with an ST-506 compatible disk drive controller such as the WD-1003 manufactured by Western Digital Corporation. As the ST-506 standard supports two disk drives, the IDE interface also supports two drives which are referred to as master/slave drives. As both drives are mapped to the same location, each drive must monitor a set of interface register known as a task file register and respond only when that drive is selected by the select drive bit (SDB) register.

In a standard IBM compatible personal computer, the Basic Input/Output System (BIOS) software supports a primary IDE channel interface having a number of I/O ports accessible via the task file interface: 0x01F0h (data port, 16 bits), 0x01F1h-0x01F7h (command and status port, 8-bit access only), and 0x03F6h-0x03F7h (reset drive and alternate status, 8-bit access only). Additionally, a second channel with IDE ports located at 0x0170h-0x01Fh and 0x0376h-0x0377h is supported by the standard BIOS. To individually select the register ports, each channel provides chip select signals CS1 to decode registers located at I/O addresses 0x01FXh and 0x017Xh of the task file register and CS3 to further decode the data and control registers residing at I/O addresses 0x03F6h-0x03F7h and 0x0376h-0x0377h of the task file register. In this manner, the standard BIOS supports two IDE channels with separate pairs of CS1 and CS3 signals.

Although a computer with two IDE channels can electrically support up to two master drives and two slave drives, the limited space in the portable computer allows for only two drives. These drives can be configured in either a one channel configuration where both drives share the same channel located at the same I/O address, or a two channel configuration where each drive is mapped to a separate channel located at a different I/O address.

Although the one channel configuration conserves I/O space, the one channel configuration suffers from two problems which limit performance. First, the access speed of the entire channel is limited to the speed of the slower device sharing the channel when drives which do not support the optional I/O access complete signal IORDY are used. As the access speed of the master-slave pair is limited to the speed of the slower drive for non-data access, the mixing of the disk drive with the much slower CD-ROM player causes undesirable delays. Second, the single channel configuration allows only one drive to be accessed at a time. Thus, for optimum performance, each of the IDE drives should be connected as a master to separate channels to allow parallel accesses to the drives.

Although this master-master mode provides the best performance, the docking of the portable computer into the base unit creates a potential conflict because the base unit supports two additional IDE channels. Therefore, the docked system offers up to four masters. Since the standard BIOS supports only two channels for a maximum of two masters and two slaves, the two additional channels in the expansion base unit could not be recognized by the standard BIOS. Consequently, in a system where the portable computer's drives are assigned to two channels for performance reasons, drives on the expansion unit would be inaccessible to the user.

Although the BIOS software could be modified to support four IDE channels, backward compatibility with earlier personal computers requires that the data storage devices be accessible through a maximum of two IDE channels, whether the portable computer is operating alone or docked with the expansion base unit.

SUMMARY OF THE INVENTION

A dual-master data storage interface is disclosed which flexibly configures and connects data storage drives in the portable computer to optimize performance when the portable computer is operating in a stand-alone mode. The invention further optimizes accessibility to additional data storage drives when the portable computer is docked to an expansion unit.

The interface has first and second channels adapted to control first and second data storage drives and registers for configuring each drive as a master drive or a slave drive. When the portable computer operates as a stand-alone unit (i.e., not docked to the expansion unit), each drive on the portable is configured to operate as a master drive which is separately connected to a channel to optimize performance.

Upon detecting a docking sequence between the portable computer and the expansion unit, the first channel on the portable computer is connected via switches to both drives of the portable computer, while the second channel on the portable computer is disconnected. Further, the first data storage drive is configured as a master and the second data storage drive is configured as a slave drive on the portable computer side. Correspondingly, the drives located on the expansion base unit are reconfigured and remapped as master and slave drives on the second channel on the expansion base unit, while the first channel on the expansion base unit is disconnected. Thus, when the portable computer is docked to the expansion base unit, the drives on the portable computer are mapped as a master-slave pair on the first channel while the drives on the expansion base unit are mapped as another master-slave pair on the second channel. Thus, the present invention allows access to all drives in a manner that is compatible with the standard BIOS when the portable computer is docked with the expansion unit.

Upon separation, each drive on the portable computer is configured and remapped as a master on a separate channel for maximizing data transfer performance. Thus, by allowing for flexibility in changing the drive configuration and channel connection, the invention ensures compatibility with the standard BIOS when the portable computer is docked with the expansion unit. Further, the present invention optimizes data transfer performance from the drives when the portable computer is separated from the expansion unit.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/684,486, entitled "BUS SYSTEM FOR SHADOWING REGISTERS," by Dwight D. Riley and David J. Maguire, filed concurrently herewith;

U.S. application Ser. No. 08/684,412, entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards, filed concurrently herewith;

U.S. application Ser. No. 08/684,485, entitled "LONG LATENCY INTERRUPT HANDLING AND INPUT/OUTPUT WRITE POSTING," by David J. Maguire and James R. Edwards, filed concurrently herewith;

U.S. application Ser. No. 08/684,710, entitled "SERIAL BUS SYSTEM FOR SHADOWING REGISTERS," by David J. Maguire and Hung Q. Le, filed concurrently herewith;

U.S. application Ser. No. 08/684,584, entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. application Ser. No. 08/671,316, entitled "TWO ISA BUS CONCEPT," by Gregory N. Santos, James R. Edwards, Dwight D. Riley and David J. Maguire, filed concurrently herewith; and U.S. application Ser. No. 08/684,255, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

Figure 1:
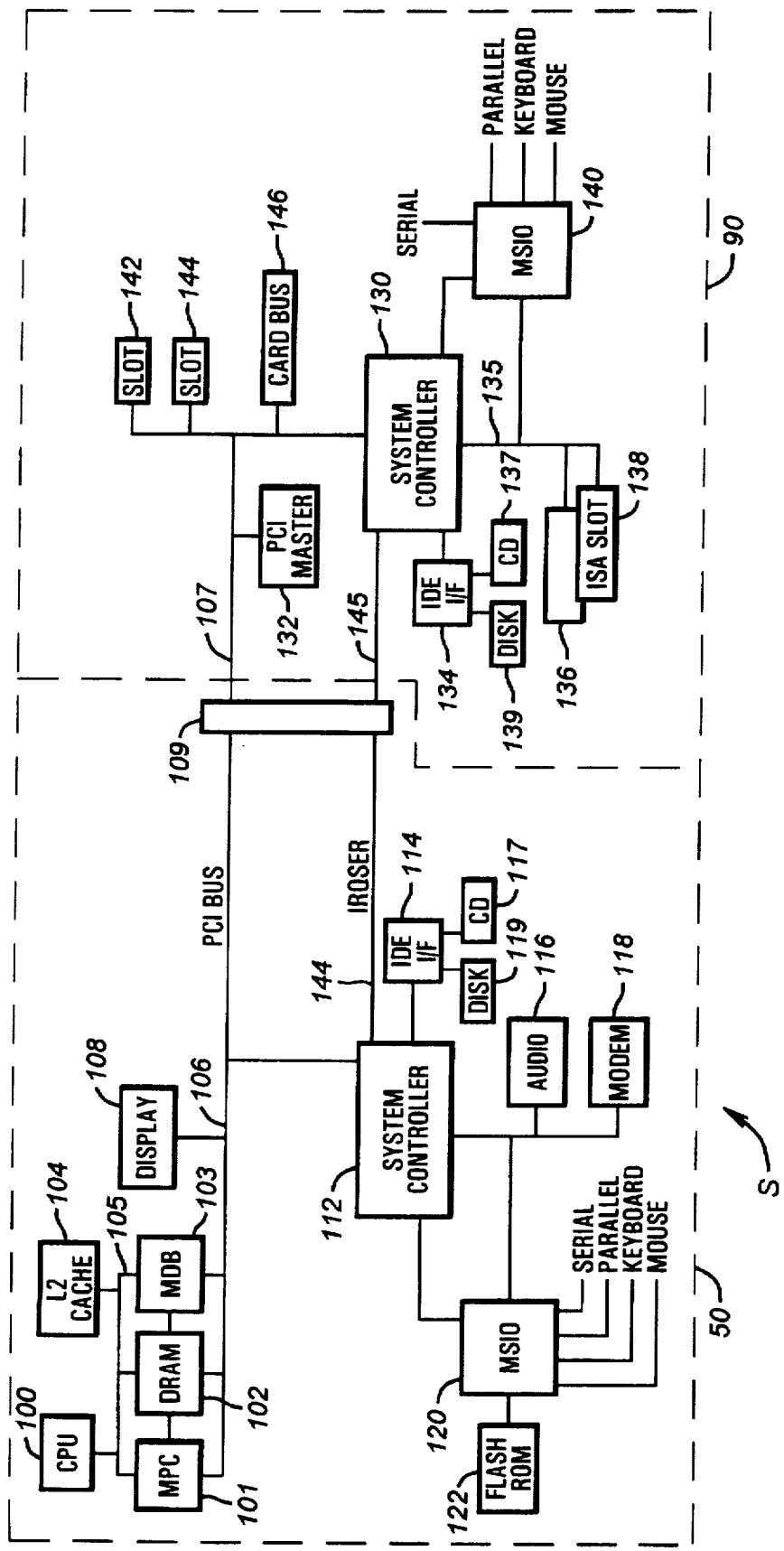
FIG. 1 is a block diagram of a computer system having a dual-master IDE interface in accordance with the present invention.

Referring now to FIG. 1, a computer system S according to the present invention is shown. In FIG. 1, the system S includes a portable computer 80 and an expansion base unit 90. Within the portable computer 80, a CPU 100 and a level two (L2) cache 104 are connected to a high speed local bus 105. The processor 100 of the preferred embodiment is one of the 80X86 microprocessor family manufactured by Intel Corporation of Santa Clara, Calif. In the preferred embodiment, the processor operates with a standard IBM-PC compatible operating system, such as MS-DOS or Windows, available from Microsoft Corporation of Redmond, Wash. The L2 cache 104 provides additional caching capabilities to the processor's on-chip cache to improve performance.

In addition to the CPU 100 and cache 104, a number of memory interface and memory devices are connected between the local bus 105 and a PCI bus 106. These devices include a memory to PCI cache controller (MPC) 101, a dynamic random access memory (DRAM) array 102, and a memory data buffer (MDB) 103. The MPC 101 is connected to the DRAM array 102, which is further connected to the MDB 103. The MPC 101, DRAM array 102, and MDB 103 collectively form a high performance memory system for the computer system S. A display 108 is also connected to a PCI bus 106.

The PCI bus 106 is also connected to a system controller 112. The system controller 112 is a PCI to ISA bus bridge which also provides various support functions distributed between the portable computer 80 and the expansion base unit 90 of the system S. Preferably the system controller 112 is a single integrated circuit that acts as a PCI bus master and slave, an ISA bus controller, an ISA write posting buffer, an ISA bus arbiter, DMA devices, and an IDE disk interface. The system controller 112 is connected to an audio board 116 and a modem 118 as conventionally present in PC systems to provide sound and data communication capabilities for the system S via a first ISA interface 121. The IDE interface 114 of the system controller 112 drives one or more hard disk drives, preferably a CD-ROM player 117 and a disk drive 119. Further, the system controller 112 provides a single pin output to support a interrupt serial bus (IRQSER) 144.

The system controller 112 is connected to an MSIO (mobile super I/O) chip 120. The MSIO 120 is connected to a flash ROM 122. The flash ROM 122 receives its control, address and data signals from the MSIO 120. Preferably, the flash ROM 122 contains the BIOS information for the computer system S and can be reprogrammed to allow for revisions of the BIOS. Additionally, the MSIO 120 provides a parallel port, a serial port, a keyboard interface and a mouse interface, among others, for the computer system S.

A plurality of Quick Connect switches 109 are also connected to the PCI bus 106. Upon detecting a docking sequence between the portable computer 80 and the base unit 90, the Quick Connect switches 109 couple the PCI bus 106 and the IRQSER bus 144 to an expansion PCI bus 107 and an expansion IRQSER bus 145 on the base unit 90. The Quick Connect switches 109 are series in-line FET transistors having low $r_{ds}$, or turn-on resistance, values to minimize the loading on the PCI buses 106 and 107 and the IRQSER buses 144 and 145.

Turning now to the expansion base unit 90, one or more PCI masters 132 are connected on the expansion PCI bus 107, which is adapted to be connected to the PCI bus 106 over the Quick Switches 109 when the portable computer 80 is docked to the expansion base unit 90. The PCI bus 107 is also connected to PCI slots 142 and 144 and also to a card-bus interface 146 for accepting expansion cards. Also connected to the expansion PCI bus 107 is a second system controller 130, which is preferably a second integrated circuit of the same type as the system controller 112. The system controller 130 is connected to the expansion PCI bus 107 and the interrupt serial bus 145. The system controller 130 supports additional drives 137 and 139 through a second IDE interface 134. The system controller 130 also supports an ISA bus 135 which is connected to one or more ISA slots 136 and 138. The system controller 130 is further connected to a second MSIO device 140, which provides a secondary parallel port, serial port, keyboard interface and mouse interface.

Thus, the system S, upon docking, may have multiple parallel ports, serial ports, keyboards, mice, and disk drives via the system controllers 112 and 130. Additionally, the system S may have a plurality of PCI and ISA type peripherals on their respective buses. The availability of a plurality of slots allows more peripherals to be connected to the system S and contributes to the useability and flexibility of the portable computer 80 when it is docked to the expansion base unit 90.

The plurality of IDE interfaces 114 and 134 on system controllers 112 and 130 provide the capability to expand the data storage capability of the system S. The IDE interfaces 114 and 134 require a mechanism for mapping drives configured in the master-master configuration into a master-slave configuration when the portable computer 80 is docked to the base expansion unit 90 for BIOS compatibility purposes and which remaps the drives back into a master-master mode after the separation of the portable computer 80 from the base expansion unit 90 to ensure optimal performance.

Figure 2A:
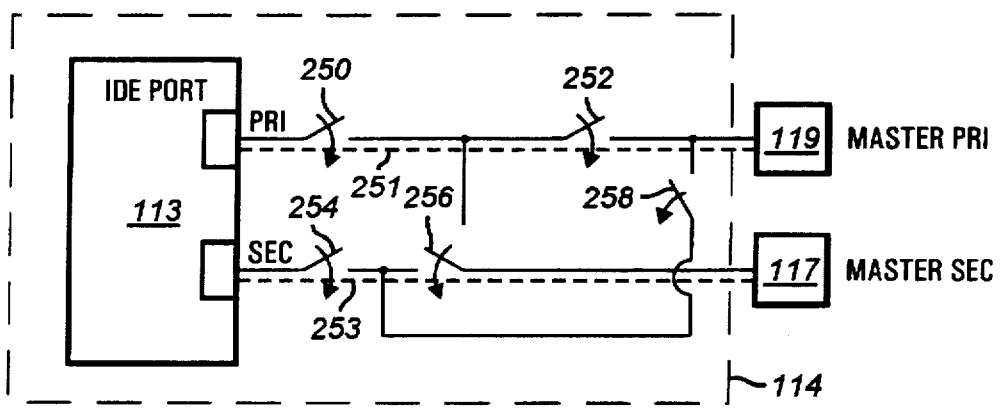
FIG. 2A is a block diagram showing the arrangement of drives on the portable computer when the portable computer is separated from the expansion base unit according to the present invention.
Figure 2B:
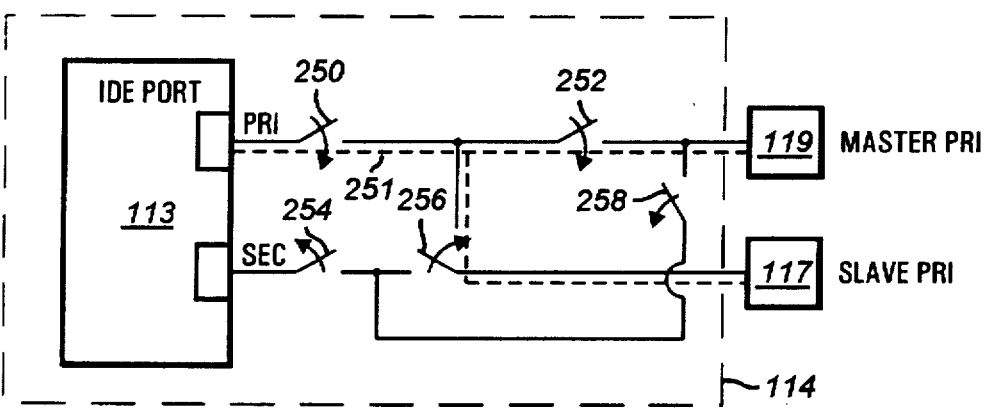
FIG. 2B is a block diagram showing the arrangement of drives on the portable computer when the portable computer is docked with the expansion base unit according to the present invention.
Figure 2C:
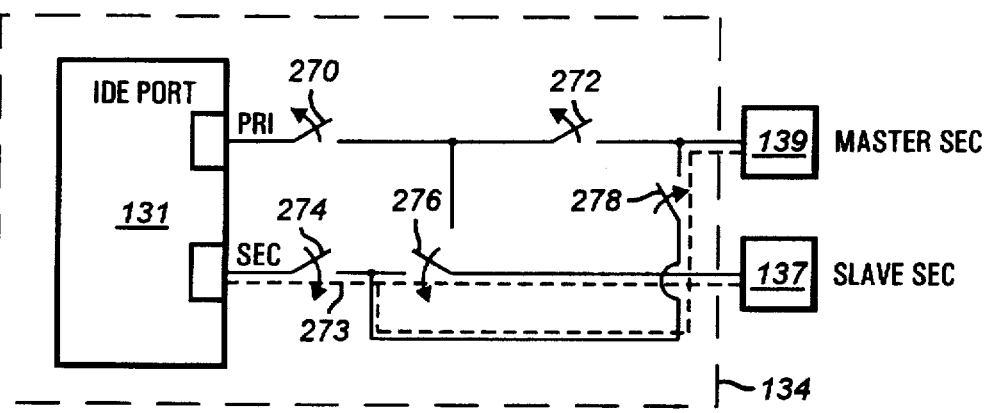
FIG. 2C is a block diagram showing the arrangement of drives on the expansion base unit when the portable computer is docked with the expansion base unit according to the present invention.

Turning now to FIGS. 2A, 2B and 2C, simplified illustrations showing the relationship and data flow among drives 117, 119, 137 and 139 in the system S for the docked and undocked states are shown. FIG. 2A illustrates the configurations of drives 117 and 119 when the portable computer 80 is disconnected from the expansion base unit 90. FIG. 2B illustrates the configurations of drives 117 and 119 when the portable computer 80 is docked with the expansion base unit 90. FIG. 2C illustrates the configurations of drives 137 and 139 on the expansion base unit 90 when the portable computer 80 is docked with the expansion base unit 90.

In FIG. 2A, the drive 119 is attached as a master to channel 1 of the IDE interface, while the drive 117 is attached as a master to channel 2 of the IDE interface of the portable computer 80 via switches 250–258. It is noted that switches 252, 254, 256 and 258 are located inside the IDE interface section 113 of the custom system controller device 112 which provides the two IDE channels. The switch 250 is connected to the primary channel of the IDE port 113. The output of the switch 250 is connected to the input of the switch 252. The output of the switch 252 is connected to the data storage device 119. Further, the input of the switch 254 is connected to the secondary channel of the IDE port 113. The output of the switch 254 is connected to the input of the switch 258, whose output is connected to the data storage device 119. The output of the switch 254 is also connected to one input of the switch 256 which is a two-to-one selector. The second input of the switch 256 is connected to the junction between switches 250 and 252. The output of the switch 256 is connected to the data storage device 117. As discussed below, the configuration of the switches 250–258 allow the data storage devices 117 and 119 to be flexibly configured as a master-master pair or a master-slave pair.

When the portable computer 80 is undocked, switches 250 and 252 are closed to complete the electrical path from the primary channel PRI of the IDE port 113 to the data storage drive 119 which is set as a master drive. The switch 254 is closed, while the switch 256 is set to connect the output of the switch 254 to the data storage device 117. Further, the switch 258 is opened to break the electrical path between the secondary channel SEC and the primary channel PRIM of the IDE port 113. Additionally, the data storage device 117 is also set as a master drive. Thus, the dashed lines 251 and 253 of FIG. 2A shows that in the undocked portable computer system 80, data storage drives 117 and 119 are separately connected and configured in the master-master mode to optimize drive performance.

Turning now to FIG. 2B, the relationship and data flow among drives 117 and 119 are shown when the portable computer 80 is docked with the expansion base unit 90. When the portable computer 80 is docked, switches 250 and 252 remain closed to connect the primary channel PRI of the IDE port 113 to the data storage drive 119 which is set as a master drive. However, switches 254 and 258 are opened, while the switch 256 connects the output of the switch 250 to the data storage device 117, which is reconfigured as a slave device. Thus, in the docked portable computer system 80, data storage drives 117 and 119 are configured in the master-slave mode on the primary channel, as shown in the dash line 251, to conserve the channel utilization so that devices on the expansion base can still be accessed by the processor on the portable computer 80 on the remaining channel two, or the secondary channel. It is to be noted that in this configuration, the secondary channel, or channel two, is disconnected from the data storage device 117.

Turning now to FIG. 2C, the relationship and the data flow for the data storage drives 137 and 139 on the expansion base unit 90 when docked with the portable computer 80 are shown. Similar to the switches present in the portable computer 80, the expansion base unit 90 has a plurality of switches 270-278 which connects the drives 137 and 139 to the respective channels.

In FIG. 2C, the drive 139 is configured upon docking as a master to channel 2 of the expansion base unit IDE interface 131, while the drive 137 is attached upon docking as a slave to channel 2 of the IDE interface of the expansion base unit 90 via switches 270-278. It is noted that switches 270, 272, 274, 276 and 278 are located inside the IDE interface section 131 of the custom system controller device 130 which provides the two IDE channels.

The switch 270 is connected to the primary channel of the IDE port 131. The output of the switch 270 is connected to the input of the switch 272. The output of the switch 272 is connected to the data storage device 139. Further, the input of the switch 274 is connected to the secondary channel of the IDE port 131. The output of the switch 274 is connected to the input of the switch 278, whose output is connected to the data storage device 139. The output of the switch 274 is also connected to one input of the switch 276 which is a two-to-one selector. The second input of the switch 276 is connected to the junction between switches 270 and 272. The output of the switch 276 is connected to the data storage device 137. As discussed below, the configuration of the switches 270-278 allow the data storage devices 137 and 139 to be flexibly configured as a master-slave pair which can be mapped into either the primary channel or the secondary channel, depending on the actions of the switches 270-278.

In the event that the BIOS can support four master drives, switches 270 and 272 are closed to complete the electrical path from the primary channel PRI of the IDE port 131 to the data storage drive 139 which is set as a master drive. The switch 274 is closed, while the switch 276 is set to connect the output of the switch 274 to the data storage device 137. Further, the switch 278 is opened so that the electrical path from the secondary channel SEC of the IDE port 131 to the data storage device 137 which is also set as a master drive. Thus, where the system BIOS can support four masters, data storage drives 137 and 139 are suitably connected and configured in the master-master mode to optimize drive data transfer performance.

Alternatively, in the event that the standard BIOS is used which supports up to two master drives, when the portable computer 80 is docked with the expansion base unit 90, switches 270 and 272 are opened to disconnect the primary channel PRI of the IDE port 131 from the data storage drive 139 which is set as a master drive. Further, switches 274 and 278 are closed, while the switch 276 connects the output of the switch 274 to the data storage devices 137 and 139. Additionally, the data storage device 137 is configured as a slave device. Thus, as shown in the dashed line 273 of the docked portable computer system 80 having the standard BIOS, data storage drives 137 and 139 are configured in the master-slave mode on the secondary channel, or channel two, such that devices on the expansion base is accessible to the processor on the portable computer 80 via the channel two, or the secondary channel. It is to be noted that in this configuration, the primary channel, or channel one, on the expansion base unit 90 is not connected to any data storage drives.

Although the preferred embodiment of FIG. 2C uses a docking protocol where the drives 117 and 119 default to channel one, or the primary channel, while the drives 137 and 139 default to channel two, or the secondary channel, it should be understood that the present invention can be adapted to address the reverse default conditions such that the drives on the portable computer 80 are mapped to the secondary channel while the master-slave drives on the expansion base unit 90 are mapped to the primary channel.

Additionally, it should be understood that the mapping of the drives 117, 119, 137 and 139 into their respective channels is configurable. Thus, upon docking, the drives 117 and 119 are configured into a master-slave combination which can be connected to either the primary or the secondary channel. The IDE port 131 on the expansion base unit 90 would initially configure the drives 137 and 139 into a master-slave combination. The IDE port 131 next detects the channel assignment of the master-slave drive combination 117 and 119 on the portable computer 80, and connects the master-slave drive combination 137 and 139 on the expansion base unit 90 to the remaining complementary channel.

In sum, it is contemplated by the present invention that the default channel assignment can be reversed such that the drives on the portable computer 80 are assigned to channel two, while the drives on the expansion base unit 90 are assigned to channel one. Further, the assignment can be programmable an performable on the fly by software configuration of the drives to their respective channels. Thus, the channel assignments of the drives 117, 119, 137 and 139 are configurable and not limited to a fixed channel assignment scheme.

As illustrated and discussed above, when the portable computer 80 is not docked to the expansion base unit 90, drives 117, 119, 137 and 137 are connected to separate IDE channels and operate as masters to optimize data transfer performance. When the portable computer 80 is docked, however, the system must recognize the additional IDE drives 137 and 139. Therefore, according to the invention, when the portable computer 80 is docked, the switches 250-258 connect drives 117 and 119 as the master-slave pair attached to one of the channels, preferably the primary channel, of the portable computer 80. The channel reallocation process frees up the remaining channel, preferably the secondary channel, for use by the expansion base unit 90 which is in turn connected to drives 139 and 137. The switches 270–278 appropriately reconnect the drives 137 and 139 to the secondary channel previously vacated by the switches 250–258 during the docking sequence. The drives 137 and 139 are then configured as a master-slave pair and attached to the secondary channel. Next, the pointers to the drive entries are reconfigured to reflect the new master-slave combinations. In this manner, all drives 117, 119, 137 and 139 are connected and visible to the standard BIOS.

Figure 3:
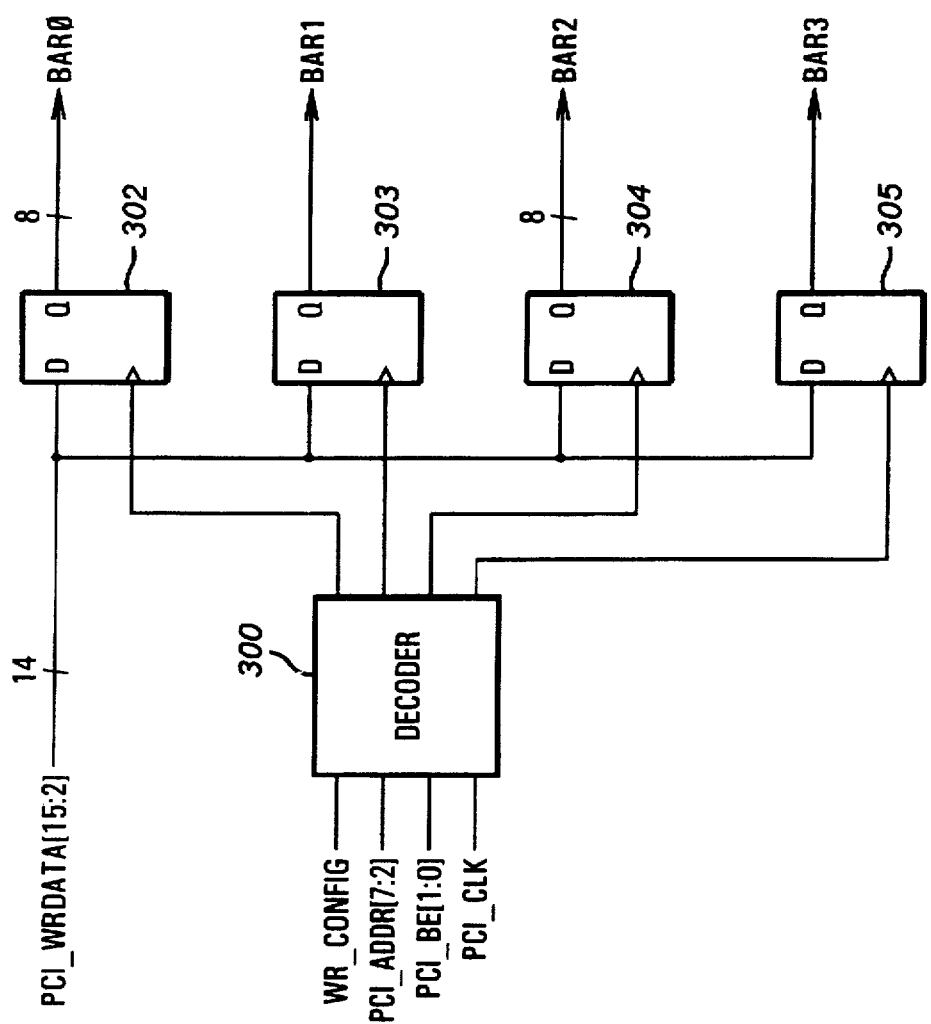
FIG. 3 is a schematic illustration of the registers for configuring the base addresses of the IDE drives.

Turning now to FIGS. 3–10, the circuits to configure drives 117 and 119 are shown in more detail. FIG. 3 illustrates the circuitry for configuring the base addresses of the IDE channels. A decoder 300 receives a write configuration signal WR_CONFIG, address signals PCI_ADDR, byte enable signals PCI_BE, and the PCI clock signal PCI_CLK. The decoder 300 outputs are connected to the clock inputs of registers 302, 303, 304 and 305. Registers 302–305 are 8-bit registers connected to PCI_WRDATA [15:2]. The outputs of registers 302, 303, 304 and 305 are base address registers BAR0, BAR1, BAR2 and BAR3. BAR0–BAR3 are registers defined in the SFF-8038i Standard entitled "Information Specification for Bus Master Programming Interface for IDE ATA Controllers, Rev. 1.0" (May 16, 1994), available from SFF Committee in Saratoga, Calif. The circuit of FIG. 3 thus stores the base address registers which can be reconfigured by writing configuration data registes 302–305 and selecting the registers 302–305 via the decoder 300.

In a programmed I/O transfer cycle, the processor 100 addresses drives 117 and 119 using the following I/O map, which defines all of the register addresses and functions for these I/O locations. A description of each register follows below:

| Address | | | | | | WRITE |
|---|---|---|---|---|---|---|
| CS1* | CS3* | XA2 | XA1 | XA0 | READ FUNCTION | FUNCTION |
| 1 | 1 | X | X | X | No operation | No operation |
| 0 | 0 | X | X | X | Invalid addr. | Invalid addr. |
| 1 | 0 | 0 | X | X | High Impedance | Not used |
| 1 | 0 | 1 | 0 | X | High Impedance | Not used |
| 0 | 1 | 0 | 0 | 0 | Data register | Data register |
| 0 | 1 | 0 | 0 | 1 | Error register | Write Precomp. Register |
| 0 | 1 | 0 | 1 | 0 | Sector Count | Sector Count |
| 0 | 1 | 0 | 1 | 1 | Sector Number | Sector Number |
| 0 | 1 | 1 | 0 | 0 | Cylinder Low | Cylinder Low |
| 0 | 1 | 1 | 0 | 1 | Cylinder High | Cylinder High |
| 0 | 1 | 1 | 1 | 0 | SDH register | SDH register |
| 0 | 1 | 1 | 1 | 1 | Status register | Command register |
| 1 | 0 | 1 | 1 | 0 | Alt. Status reg | Dig Output register |
| 1 | 0 | 1 | 1 | 1 | Drive Addr. reg. | Not used | where X is a don't care

Figure 4:
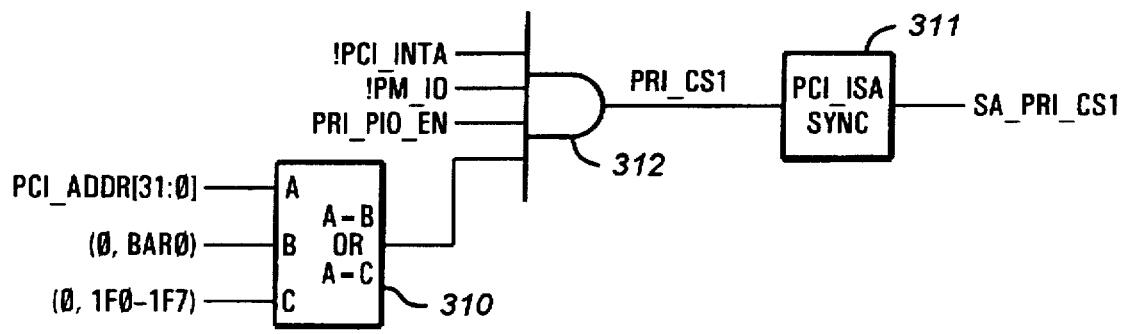
FIG. 4 is a schematic illustration of a circuit for generating chip select signals for the first drive channel.
Figure 4:
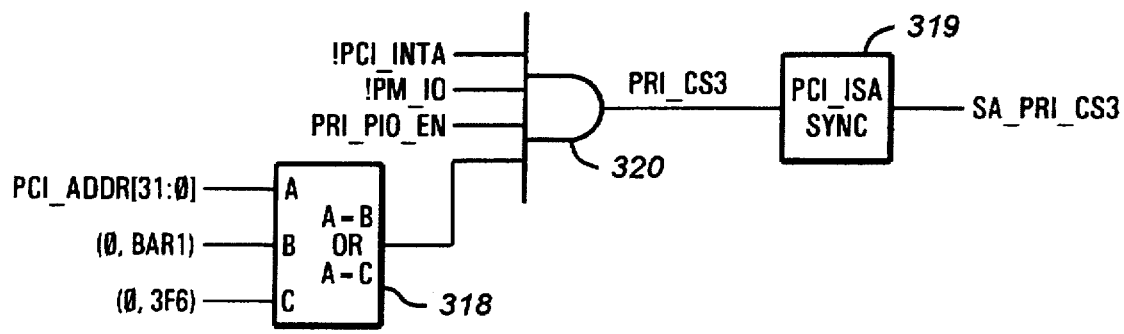
Figure 5:
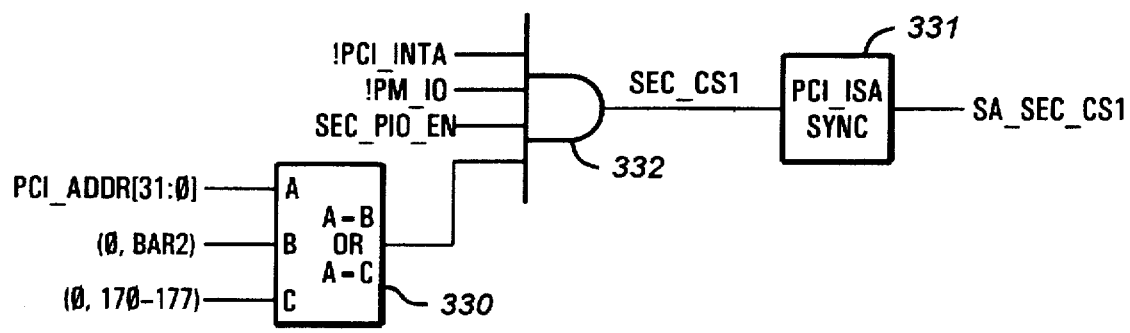
FIG. 5 is a schematic illustration of a circuit for generating chip select signals for the second drive channel.
Figure 5:
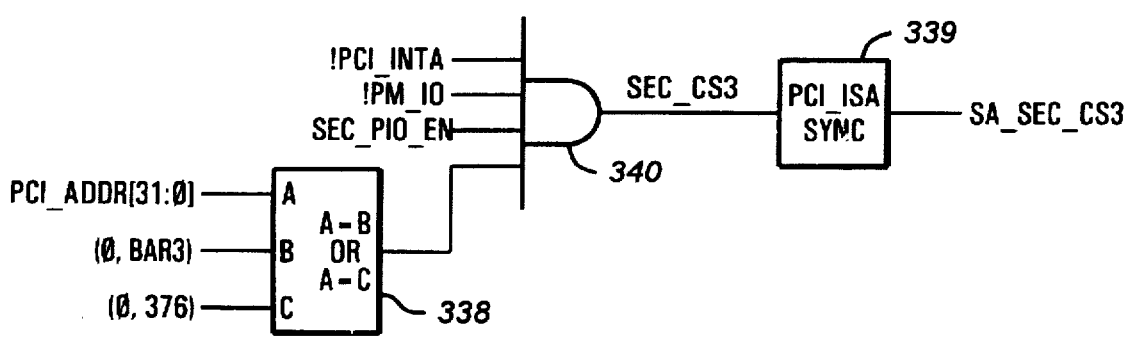

Turning now to FIGS. 4 and 5, the circuitry to provide the respective CS1 and CS3 signals for each IDE channel are shown. The specific addresses for CS1 and CS3 are set aside for disk drive utilization in the standard BIOS and the drives respond to the commands issued by the BIOS. On the IBM PC, the I/O addresses 0x1F0h-0x1F7h and 0x3F6h-0x3F7h are mapped to the primary channel so that the IDE channel 1 CS1 is mapped to I/O addresses 0x1F0h-0x1F7h while the channel 1 CS3 is mapped to 0x3F6h-0x3F7h. Analogously, the I/O addresses 0x170h-0x177h and 0x3F6h-0x3F7h are mapped to the secondary IDE channel so that the IDE channel 2 CS1 is located at I/O addresses 0x170h-0x177h. Further, the channel 2 CS3 is mapped to 0x376h-0x377h.

Turning now to FIG. 4, the circuit generating CS1 and CS3 for the primary channel is disclosed. In FIG. 4, a block 310 compares the vector PCI_ADDR[31:0] to vectors which include base address registers BAR0 in the event that the native mode is used and the base address range 1F0h–1F7h if the legacy mode is desired.

If PCI_ADDR equals the vector with BAR0, or if PCI_ADDR equals the vector range 1F0h–1F7h, the block 310 asserts its output to an AND gate 312. The AND gate 312 also receives !PCI_INTA which when true indicates the PCI interrupt acknowledge cycle is not running; !PM_IO which when true indicates that the current cycle is an I/O cycle on the PCI bus; and PRI_PIO_EN, a signal indicating that the primary channel has been enabled for the programmable input/output option. PRI_PIO_EN corresponds to a programmable bit which is set during configuration of the registers. The output of the AND gate 312 is a PRI_CS1 signal for the primary channel. PRI_CS 1 is provided as an input into a PCI to ISA bus synchronization logic 311 to generate SA_PRI_CS1, the chip select signal going to the disk drive on the primary channel.

The circuit to generate PRI_CS3 will be discussed next. At the bottom of FIG. 4, the output of a vector having BAR1, if native mode is used, and a vector (0, 3F6h), if legacy mode is desired, are presented to the B and C inputs of a comparator 318. The A input of the comparator 318 is connected to the PCI address lines PCI_ADDR[31:0]. The output of the comparator 318 is presented to an input of an AND gate 320. The other inputs to the AND gate 320 include !PCI_INTA which when true indicates that a PCI interrupt acknowledge cycle is not asserted. Additionally, !PM_IO which when true indicates that the PCI bus is running an I/O cycle is provided to a second input of the AND gate 320. Finally, PRI_PIO_EN is provided to a fourth input of the AND gate 320. The output of the AND gate 320 is the CS3 signal for the primary channel PRI_CS3. The output of the AND gate 312 is presented to a second PCI to ISA synchronization logic 319 whose output is SA_PRI_CS3. SA_PRI_CS3 is provided as a synchronized chip select 3 (CS3) signal going to the disk drive.

Turning now to FIG. 5, the circuit generating CS1 and CS3 for a second channel is disclosed. In FIG. 5, a block 330 compares the vector PCI_ADDR[31:0] to vectors with base address register BAR2 and the vector 170h–177h which support the additional master drives in either the native mode or the legacy mode, as previously discussed. If PCI_ADDR equals the vector with BAR2, or if PCI_ADDR equals the vector with the range 170h–177h, the block 330 asserts its output to an AND gate 332. The AND gate 332 also receives !PCI_INTA which when true indicates the PCI interrupt acknowledge cycle is not running; !PM_IO which when true indicates that the current cycle is an I/O cycle on the PCI bus; and SEC_PIO_EN, a signal indicating that the secondary channel has been enabled for the programmable input/output option. SEC_PIO_EN corresponds to a programmable bit which is set during configuration of the registers. The output of the AND gate 332 is the SEC_CS1 signal for the second channel. SEC_CS1 is provided to a PCI to ISA synchronization logic 331 to synchronize the chip select signal CS1. The output of the synchronization logic 331 is SA_SEC_CS1, a signal provided to the disk drive to select the drive.

The circuit to generate SEC_CS3 will be discussed next. At the bottom of FIG. 5, the output of a vector of BAR3, for native mode, and a vector (0, 376h), for legacy mode, are presented to the B and C inputs of a comparator 338. The A input of the comparator 338 is connected to the PCI address lines PCI_ADDR[31:0]. The output of the comparator 338 is presented to an input of an AND gate 340. The other inputs to the AND gate 340 include !PCI_INTA which when true indicates that a PCI interrupt acknowledge cycle is not asserted. Additionally, !PM_IO which when true indicates that the PCI bus is running an I/O cycle is provided to a second input of the AND gate 340. Finally, SEC_PIO_EN is provided to a fourth input of the AND gate 340. The output of the AND gate 340 is the CS3 signal for the secondary channel SEC_CS3. The output of the AND gate 340 is provided to a PCI to ISA synchronization logic 339 which synchronizes the chip select signal SA_SEC_CS3 to control the disk drive.

Figure 6:
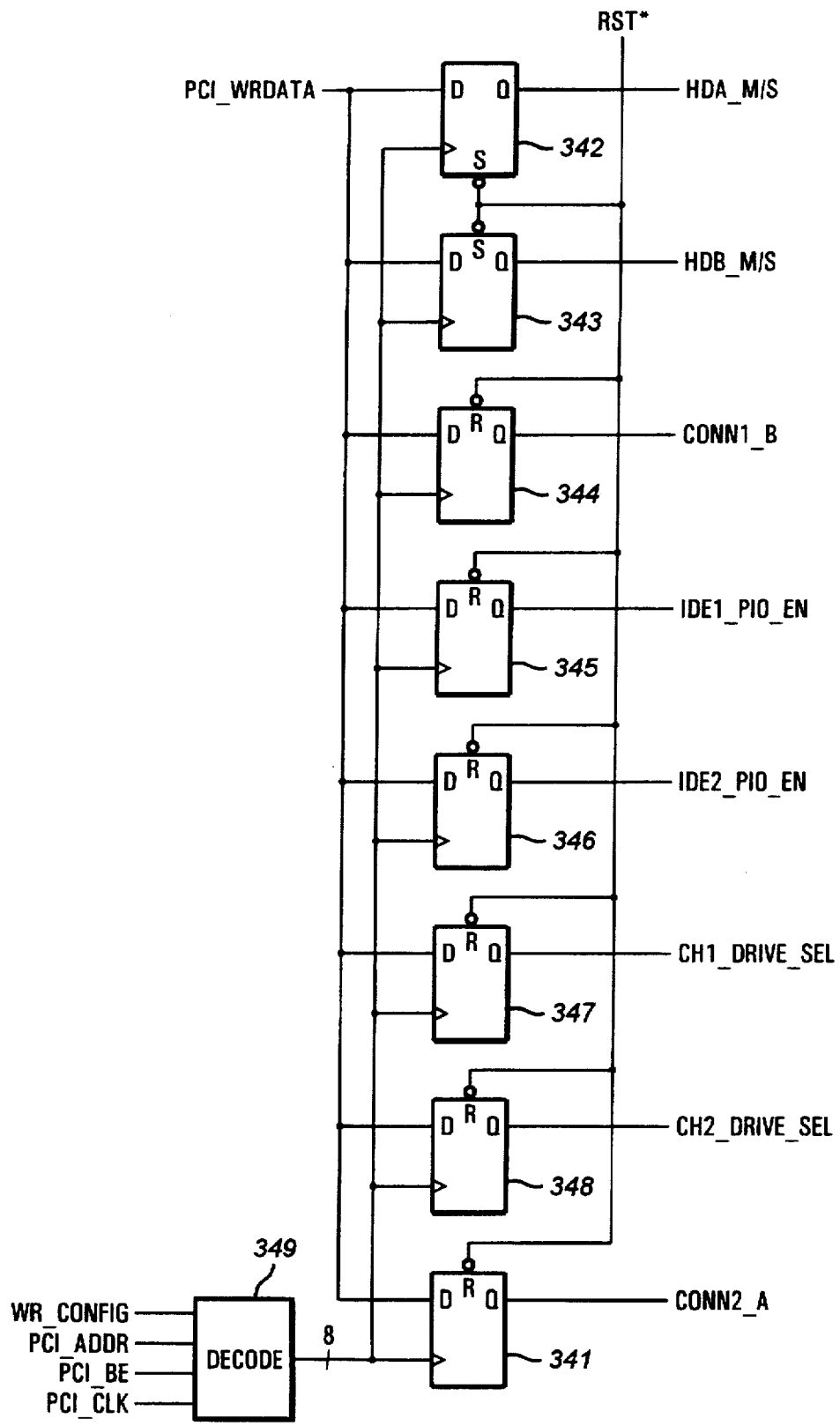
FIG. 6 is a schematic illustration of a configuration register for the drives.

Turning now to FIG. 6, the registers to store configuration data with respect to the master/slave designation of drives 117–119, the connection bits CONN1_B and CONN2_A, the PIO enable bits, and the channel select bits are disclosed. A plurality of flip-flops 341–348 store configuration data for physical drives A and B and for the primary and secondary channels. A reset signal RST* is connected to the set input of the flip-flop 342 and the reset inputs of the flip-flops 341–348. Thus, upon reset, a drive A master/slave signal HDA_M_S is set to a high indicating that drive A is the master, while a drive B master/slave signal HDB_M_S is cleared indicating that drive B is the slave. Additionally, a connection signal CONN1_B is cleared on reset to indicate that the drive B is not on the same channel as drive A. Similarly, a connection signal CONN2_A is cleared on reset to indicate that the drive A is not on the same channel as drive B. Further, programmed input/output enable signals IDE1_PIO_EN and IDE2_PIO_EN for enabling the respective drives to be in the programmed input/output (PIO) mode are cleared on reset. Additionally, shadowed channel select signals CH1_DRIVE_SEL and CH2_DRIVE_SEL for selecting channel one or channel two, are cleared during reset.

After reset, the flip-flops 341–348 can be configured using the PCI bus. Thus, the D inputs to flip-flops 341–348 are connected to eight PCI data lines of the PCI data bus which supplies the appropriate configuration values to the configuration registers. Further, the flip-flops 341–348 are individually clocked by the outputs of a decoder 349 which generates separate clocks for the flip-flops 342–348 when the PCI configuration cycle is performed and when these registers are selected via a write configuration signal WR_CONFIG, PCI address signals PCI_ADDR, PCI byte enable signals PCI_BE, and the PCI clock signal PCI_CLK.

Figure 7:
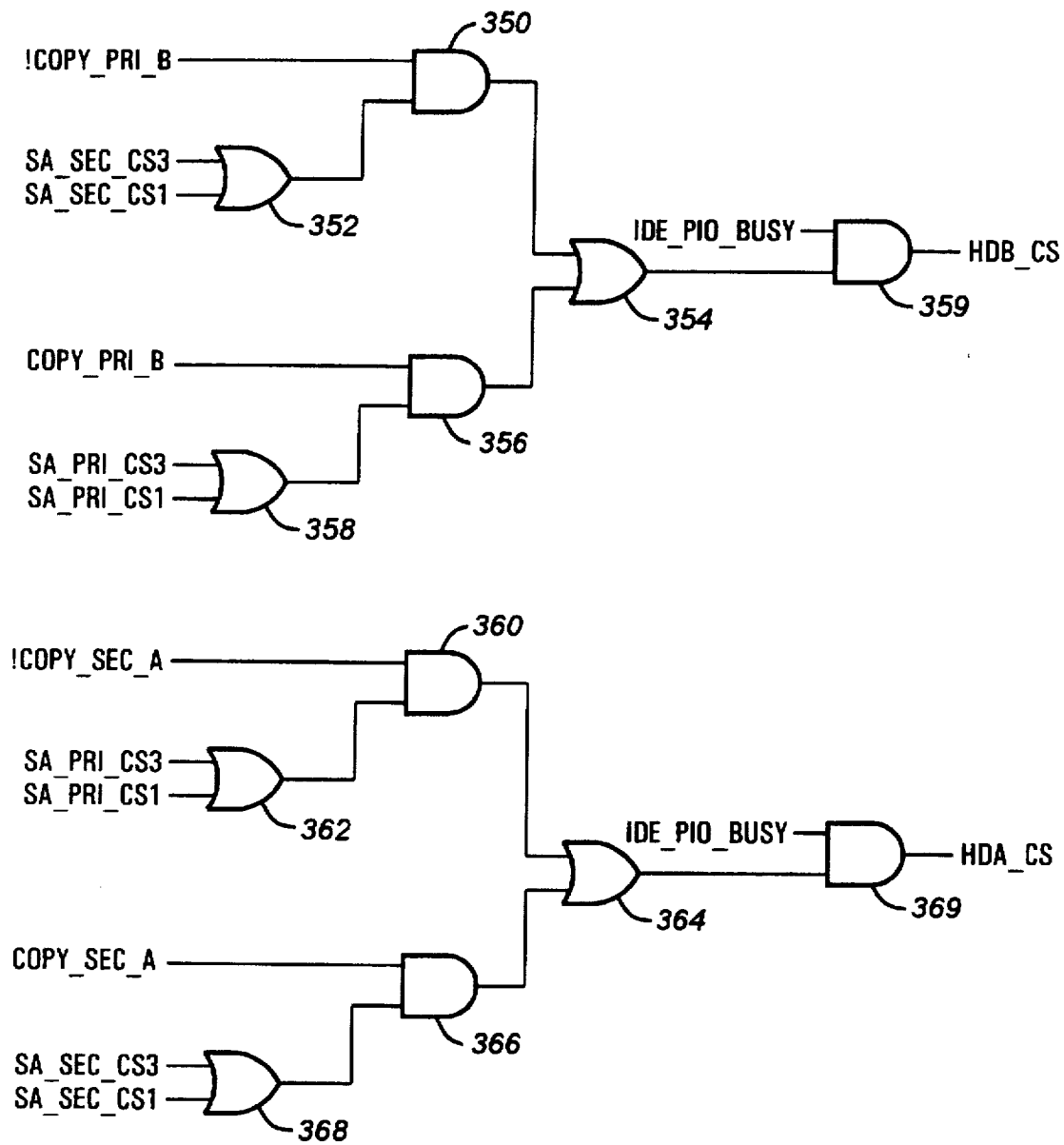
FIG. 7 is a schematic illustration of a circuit for generating the chip select signals for the physical drives.

Turning now to FIG. 7, the circuits to generate HDB_CS and HDA_CS are shown. In FIG. 7, an AND gate 350 receives !COPY_PRI_B, the negated version of a signal indicating that the primary IDE control is to be copied to hard drive B. The AND gate 350 also receives the output of an OR gate 352, whose inputs are SA_SEC_CS3 and SA_SEC_CS1 which are the secondary chip select 3 or the secondary chip select 1 signal, respectively. The output of the OR gate 352 is asserted whenever the secondary chip select 3 or the secondary chip select 1 signal has been asserted. The output of the AND gate 350 is connected to one input of an OR gate 354. The other input of the OR gate 354 is connected to the output of an AND gate 356. The AND gate 356 receives as input COPY_PRI_B and the output of an OR gate 358. The OR gate 358 receives as inputs SA_PRI_CS3 and SA_PRI_CS1 which are signals indicating that either the primary port chip select 3 or chip select 1 has been asserted. The output of the OR gate 354 is presented to the input of the AND gate 359. The AND gate 359 receives IDE_PIO_BUSY, a signal indicating that IDE parallel input/output port interface is busy. The output of the AND gate 359 is HDB_CS, or the hard drive B chip select signal.

The corresponding circuit to generate HDA_CS is shown at the bottom of FIG. 7. In FIG. 7, an AND gate 360 receives !COPY_SEC_A, the negated version of a signal indicating that the secondary IDE control is to be copied to hard drive A, and the output of an OR gate 362. The OR gate 362 receives as input SA_PRI_CS3 and SA_PRI_CS1, signals indicating that the respective primary chip select 3 or chip select 1 has been asserted. The output of the AND gate 360 is presented to the input of an OR gate 364. The other input of the OR gate 364 is connected to the output of an AND gate 366. The AND gate 366 receives as input COPY_SEC_A and the output from the OR gate 368. The OR gate 368 receives as inputs SA_SEC_CS3 and SA_SEC_CS1, signals indicating that the respective secondary chip select 3 or chip select 1 has been asserted. The output of the OR gate 364 is presented to the input of an AND gate 369, whose other input is IDE_PIO_BUSY. The output of the AND gate 369 is HDA_CS.

The HDB_CS and the HDA_CS are generated based on the decoding of the address lines, as indicated on the SA_PRI_CSX or the SA_SEC_CSX signals provided as inputs to OR gates 352, 358, 362, 368. These broadly decoded signals are gated with various copy signals COPY_PRI_A, COPY_PRI_B, COPY_SEC_A, and COPY_SEC_B. Each copy signal determines the configuration of the drives as a master/slave or master/master configuration. The decoded outputs propagate through and are finally gated with the IDE_PIO_BUSY which indicates that an IDE cycle is in process at that exact time to ensure that the address which is being decoded on the primary inputs to these circuits is valid at the exact time that the cycle is being performed.

The IDE interface 114 also supports DMA transfers using two signals per channel. Historically, programmed input/out (PIO) transfers, rather than DMA transfers, were used due to the fact that from the time of the original IBM PC/AT release, the PIO approach was faster than the DMA approach due to the low speed DMA devices then present in the PC/AT. However, as IDE based host systems have moved into higher performance applications, the DMA approach is preferred as it avoids the consumption of CPU cycles to transfer data to and from IDE peripherals and thus frees the system CPU to perform other tasks. Further, the IDE DMA interface is inherently capable of higher transfer speeds than the PIO interface due to the request/acknowledge timing advantages.

Figure 8:
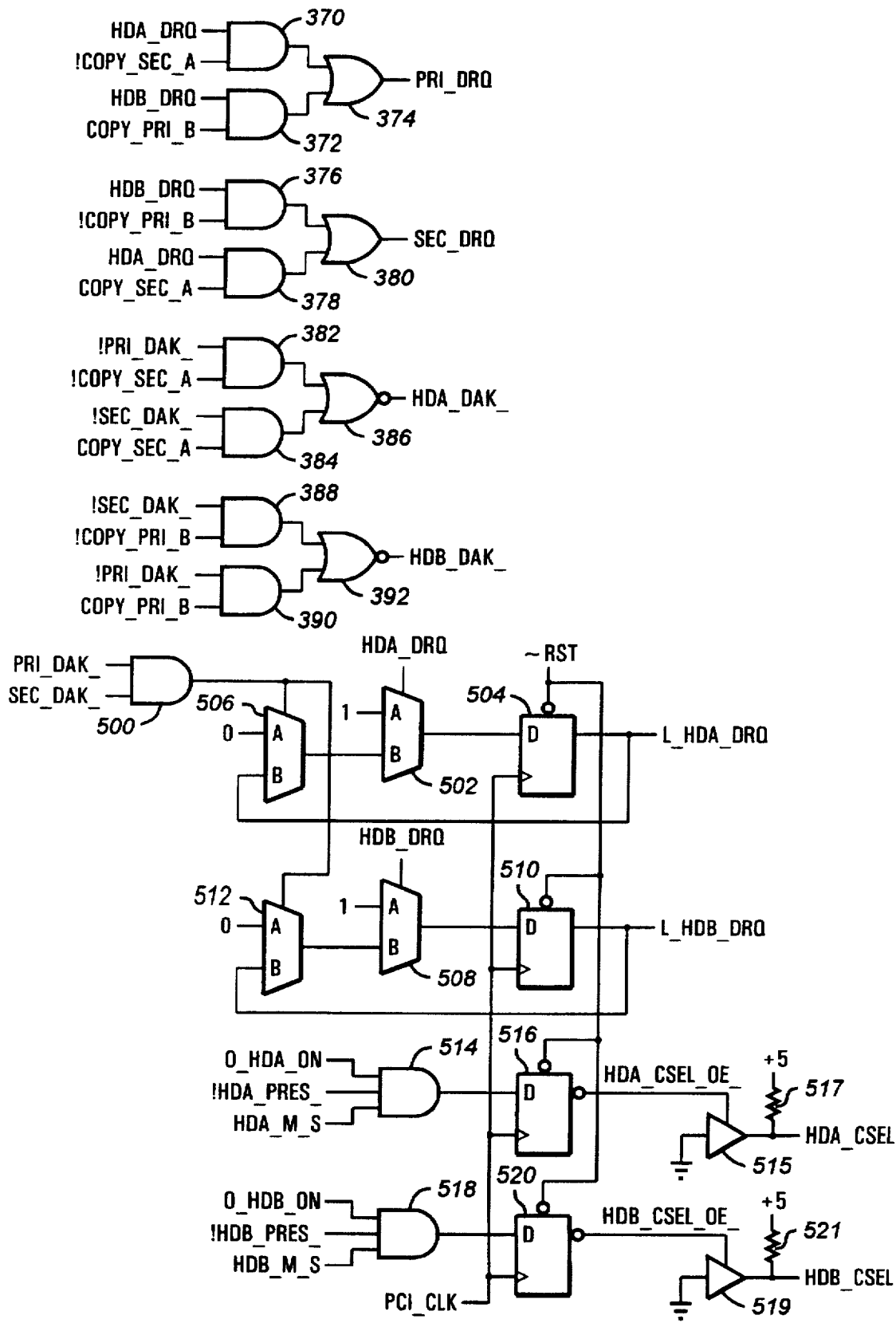
FIG. 8 is a schematic illustration of a circuit for generating direct memory access (DMA) related and drive chip select output signals.

Turning now to FIG. 8, the circuits to generate various data request, data acknowledge, and chip select signals are presented. In FIG. 8, HDA_DRQ and !COPY_SEC_A are presented to an AND gate 370. Further, HDB_DRQ and COPY_PRI_B are presented to inputs of an AND gate 372. The output of the AND gates 370 and 372 are presented to the inputs of an OR gate 374, whose output is PR_DRQ, a signal indicating that a DMA request is occurring on the primary channel. PRI_DRQ is generated when the data request, which may come from either the A drive interface or the B drive interface, is detected. PRI_DRQ further depends on the copy input and the master/slave or master/master input. These inputs determine which one of the data request inputs HDA_DRQ or HDB_DRQ should actually propagate to PRI_DRQ.

The circuit to generate SEC_DRQ, which indicates that a DMA request is occurring on the secondary channel, is similarly accomplished via AND gates 376–380. The AND gate 376 receives as inputs HDB_DRQ and !COPY_PRI_B. The AND gate 378 receives as inputs HDA_DRQ and COPY_SEC_A. The outputs of the AND gates 376 and 378 are presented to the inputs of an OR gate 380 which generates SEC_DRQ. Further, the circuit of FIG. 8 ensures that the data request input for the A interface and the data request input for the B interface are asserted in a mutually exclusive manner.

The circuits to generate the DMA acknowledge signals are presented next. An AND gate 382 receives as inputs !PRI_DAK_ and !COPY_SEC_A. Further, an AND gate 384 receives as inputs !SEC_DAK_ and COPY_SEC_A. The outputs of the AND gates 382 and 384 are provided to the inputs of a NOR gate 386. The output of the NOR gate 386 is HDA_DAK_, the DMA acknowledge signal. Similarly, an AND gate 388 receives !SEC_DAK_ and !COPY_PRI_B. Further, an AND gate 390 receives !PRI_DAK_ and COPY_PRI_B. The outputs of the AND gates 388 and 390 are provided to a NOR gate 392. The output of the NOR gate 392 is HDB_DAK_. The disclosed circuit for generating HDA_DAK_ and HDB_DAK_ thus ensures that the primary and secondary DMA request acknowledge signals coming from the IDE drives are properly routed to HDA_DAK_ or HDB_DAK_.

Turning now to the middle of FIG. 8, the circuit to generate the latched DMA request signla L_HDA_DRQ is shown. In FIG. 8, an AND gate 500 receives as inputs PRI_DAK_ and SEC_DAK_. The output of the AND gate 500 is provided to the select input of a multiplexer 506 and a multiplexer 512. Further, HDA_DRQ is provided to the select input of the multiplexer 502. The A input of the multiplexer 502 is connected to a logic one, while the B input of the multiplexer 502 is connected to the output of the multiplexer 506. The output of the multiplexer 502 is presented to the data input of a flip-flop 504. The output of the flip-flop 504 is L_HDA_DRQ, the latched signal of the HDA DMA request signal. The output of the flip-flop 504 is presented to the B input of the multiplexer 506, while the A input of the multiplexer 506 is connected to zero.

The corresponding circuit to generate L_HDB_DRQ is presented next. HDB_DRQ is presented to the select input of a multiplexer 508. The A input of the multiplexer 508 is connected to a logic one, while the B input of the multiplexer 508 is connected to the output of a multiplexer 512. The output of the multiplexer 508 is connected to the data input of a flip-flop 510. The output of the flip-flop 510 is L_HDB_DRQ, a latched version of the drive B DMA request signal. The output of the flip-flop 510 is presented to the B input of the multiplexer 512, while the A input of the multiplexer 512 is connected to zero.

The latched HDA_DRQ and the latched HDB_DRQ signals determine which device interface actually asserted the data request signals so that correct data acknowledge signals can be activated. The latched data request signal saves the state of the device which asserted the data request signal so that the appropriate HDA_SEL_ or HDB_SEL_ can be asserted in FIG. 10.

Turning to the bottom of FIG. 8, the circuit to generate the chip select signals for drive A and drive B is shown. An AND gate 514 receives as input O_HDA_ON, !HDA_PRES_, and HDA_M_S. The output of the AND gate 514 is presented to the data input of a flip-flop 516. The inverted output of the flip-flop 516 is HDA_CSEL_OE_, a negative true signal indicating that the drive A chip select enable has been asserted. The output of the flip-flop 516 is provided to the enable input of a tri-state buffer 515. The input of the tri-state buffer 515 is grounded, while the output of the tri-state buffer 515 is pulled up by a resistor 515 to generate HDA_CSEL, the drive A cable select signal.

Similarly, HDB_CSEL_OE_ is generated using an AND gate 518 and a flip-flop 520. The inputs to the AND gate 518 are O_HDB_ON, !HDB_PRES_ and HDB_M_S. The output of the AND gate 518 is presented to the data input of the flip-flop 520. The inverted output of the flip-flop 520 is HDB_CSEL_OE. The output of the flip-flop 520 is provided to the enable input of a tri-state buffer 519. The input of the tri-state buffer 519 is grounded, while the output of the tri-state buffer 519 is pulled up by a resistor 521 to generate HDB_CSEL, the drive B cable select signal.

Figure 9:
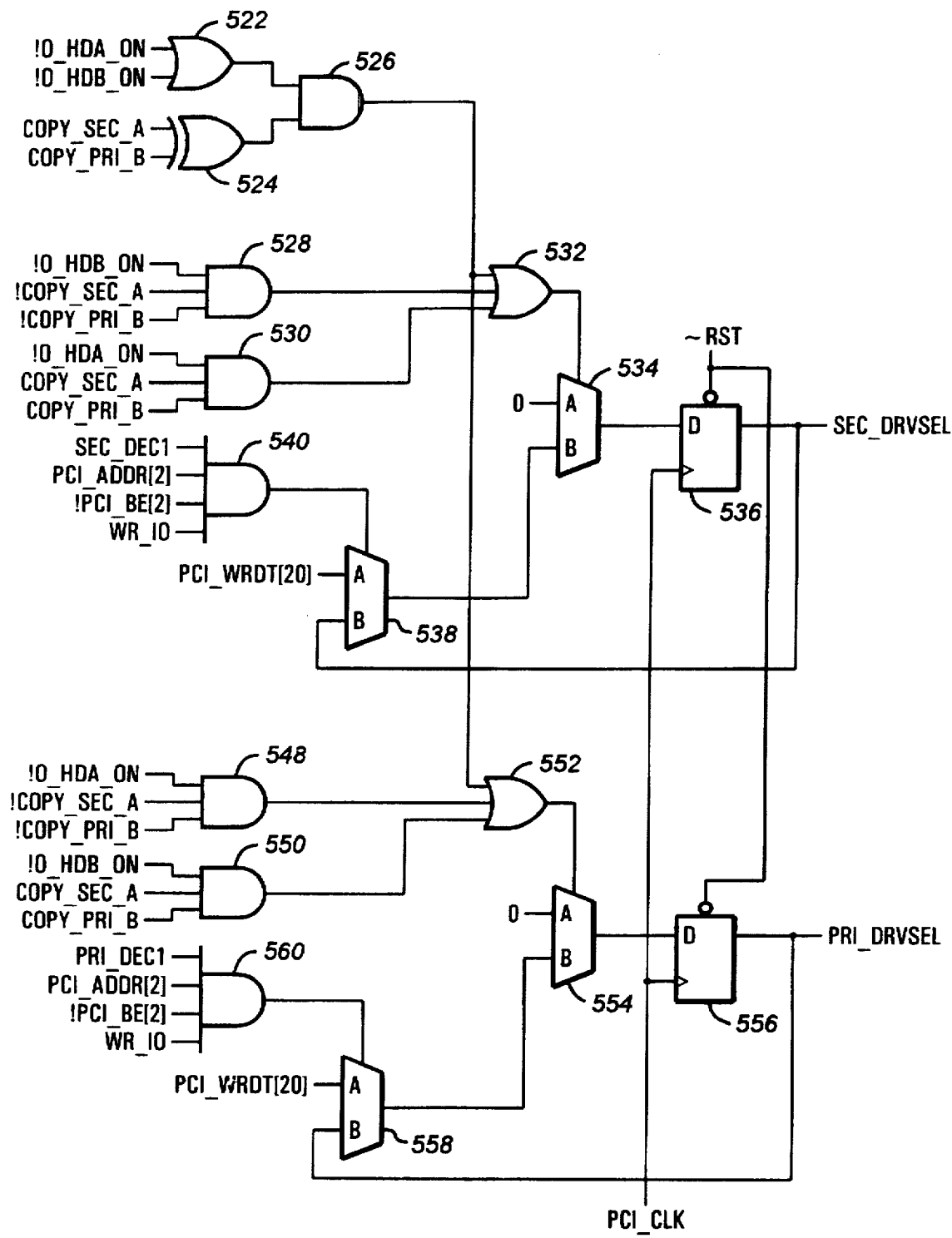
FIG. 9 is a schematic illustration of a circuit for generating primary and secondary drive select signals.

The various cable select output enable signals are used in properly selecting the appropriate drive cable interface. As shown in the bottom of FIG. 9, the inputs determine whether a particular drive interface is on, whether the interface is present and whether the interface is set as a master or a slave. Based on these conditions, the outputs of the flip-flops 516 and 530 generate cable select signals HDA_CSEL_OE_ and HDB_CSEL_OE_ which determine the particular drive to respond to the IDE cycle for connecting a master or a slave drive on a single drive interface. The flip-flops 504, 510, 516, 520 are commonly clocked by PCI_CLK. Further, the reset inputs of the flip-flops 504, 510, 516 and 520 are commonly connected to ~RST, the reset signal.

Turning now to FIG. 9, the circuits to generate the drive select signals for the primary and the secondary channels are presented. In the top of FIG. 9, an OR gate 522 receives as inputs !O_HDA_ON and !O_HDB_ON. The output of the OR gate 522 is connected to one input of an AND gate 526. The other input of the AND gate 526 is connected to an exclusive OR gate 524. The exclusive OR gate receives as inputs COPY_SEC_A and COPY_PRI_B. The output of the exclusive OR gate 524 indicates whether or not the COPY_SEC_A equals COPY_PRI_B. The output of the AND gate 526 is connected to the input of an OR gate 532. The OR gate 532 also receives the output of an AND gate 528 and the output of an AND gate 530. In turn, the AND gate 528 receives as input !O_HDB_ON,!COPY_SEC_A, and !COPY_PRI_B. The AND gate 530 receives as inputs !O_HDA_ON, COPY_SEC_A, and COPY_PRI_B. The output of the OR gate 532 is presented to the select input of a multiplexer 534. The output of the multiplexer 534 is presented to the data input of a flip-flop 536. The output of the flip-flop 536 is SEC_DRVSEL, the secondary channel drive select signal. The output of the flip-flop 536 is also presented to the B input of a multiplexer 538. The A input of the multiplexer 538 is connected to PCI_WRDT[20]. The select input of the multiplexer 538 is driven by an AND gate 540. The inputs to the AND gate 540 are SEC_DEC1, PCI_ADDR[2], !PCI_BE[2], and WR_IO. The output of the multiplexer 538 is presented to the B input of the multiplexer 534, while the A input of the multiplexer 534 is connected to zero.

The circuit to generate PRI_DRVSEL, the primary channel drive select signal, is analogous. In the bottom of FIG. 9, an OR gate 552 receives the output of the AND gate 526. Further, the OR gate 552 receives the outputs of AND gates 548 and 550. The AND gate 548 in turn receives as inputs !O_HDA_ON, !COPY_SEC_A and !COPY_PRI_B. The inputs of the AND gate 550 receives !O_HDB_ON, COPY_SEC_A, and COPY_PRI_B. The output of the OR gate 552 drives the select input of a multiplexer 554. The output of the multiplexer 554 is connected to the input of a flip-flop 556. The output of the flip-flop 556 is PRI_DRVSEL. The output of the flip-flop 556 is also presented to the B input of a multiplexer 558. The A input of the multiplexer 558 is connected to PCI_WRDT[20]. The select input of the multiplexer 558 is connected to the output of an AND gate 560. The AND gate 560 in turn receives PRI_DEC1, PCI_ADDR[2], !PCI_BE[2], and WR_IO. The output of the multiplexer 558 is connected to the B input of the multiplexer 554. The A input of the multiplexer 554 is grounded.

It is to be noted that the drive select flip-flops 536 and 556 are shadow registers which reflect the particular drive being selected on the drive interface. These flip-flops mirror the data being written to a control register of the drive, in this case, data bit 20. In this circuit, the gates 522 and 542 make sure that the primary drive interface is on and the secondary drive interface is on. Further, the master/slave drive condition is detected by the exclusive OR gate 524. Also, the gates 522, 524, 528, and 530 decode the master/slave conditions and the appropriate drive interface selection to determine whether or not the secondary drive select SEC_DRVSEL or the primary drive select PRI_DRVSEL is being updated, as performed by gates 540 and 560.

Figure 10:
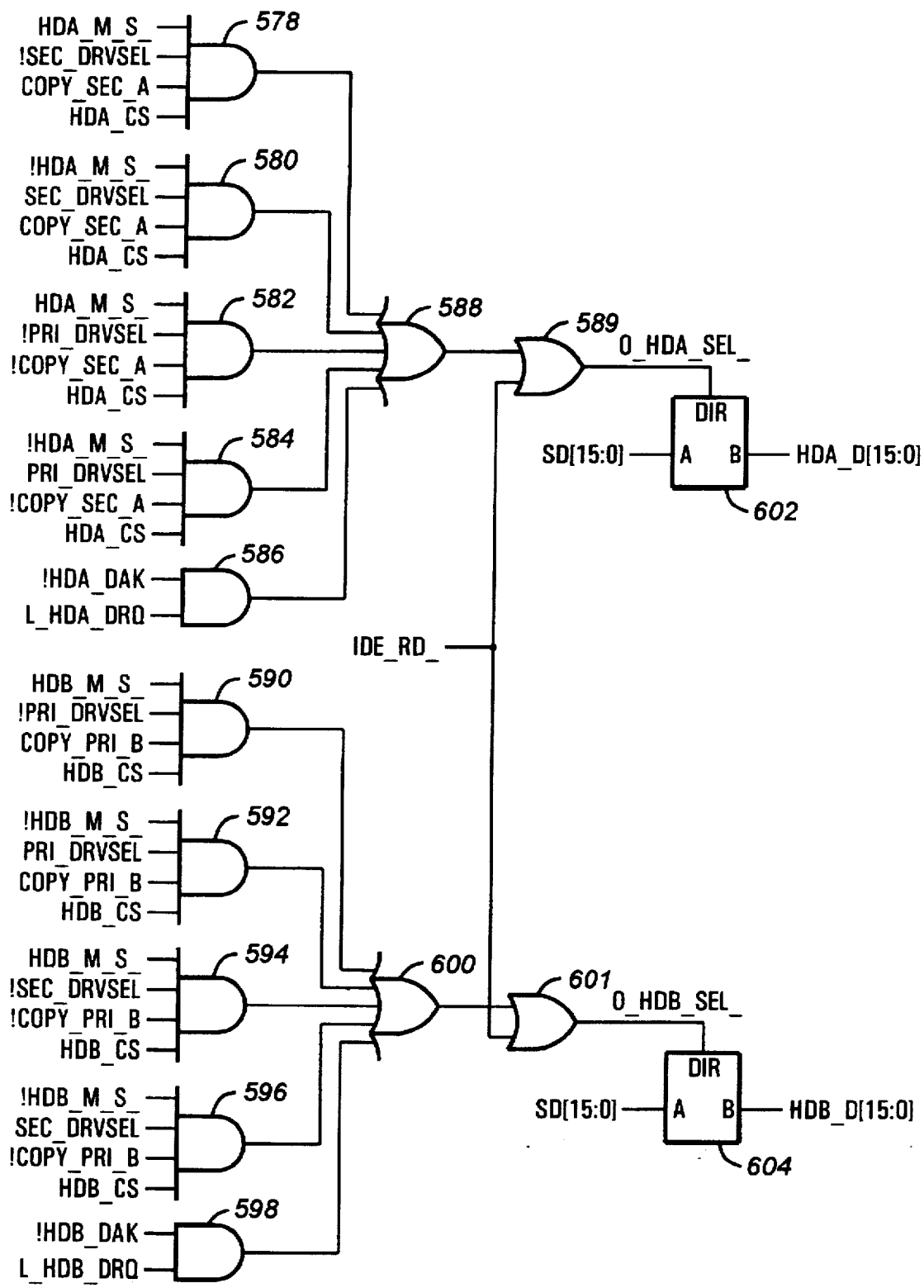
FIG. 10 is a schematic illustration of a circuit for generating drive select signals to route drive data output to the system data bus.

Referring now to FIG. 10, the circuits to generate disk drive select signals to select the connection of the data lines of drive A or drive B to the data lines of the system bus are presented. The circuit to generate the drive A select signal O_HDA_SEL_ is disclosed at the top of FIG. 10. An AND gate 578 receives as inputs HDA_M_S_, !SEC_DRVSEL, COPY_SEC_A and HDA_CS. Further, an AND gate 580 receives as inputs !HDA_M_S_, SEC_DRVSEL, COPY_SEC_A, and HDA_CS. An AND gate 582 also receives as inputs HDA_M_S_, !PRI_DRVSEL, !COPY_SEC_A, and HDA_CS. An AND gate 584 also receives as inputs !HDA_M_S_, PRI_DRVSEL, !COPY_SEC_A and HDA_CS. Finally, an AND gate 586 receives as inputs !HDA_DAK and L_HDA_DRQ. The outputs of the AND gates 578, 580, 582, 584 and 586 are presented to the inputs of an OR gate 588. The output of the OR gate 588 is ORed with IDE_RD_, the signal indicating that the IDE port is being read, using an OR gate 589. O_HDA_SEL_ is in turn provided to the direction input of a bi-directional buffer 602. The bi-directional buffer 602 is connected to SD[15:0] at its A input and to HDA_D[15:0] at its B input.

Turning to the bottom of FIG. 10, the corresponding circuit to generate the hard drive B select signal O_HDB_SEL_ is disclosed. An AND gate 590 receives as inputs HDB_M_S_, !PRI_DRVSEL, COPY_PRI_B, and HDB_CS. An AND gate 592 receives as input !HDB_M_S_, PRI_DRVSEL, COPY_PRI_B and HDB_CS. Further, an AND gate 594 receives as input HDB_M_S_, !SEC_DRVSEL, !COPY_PRI_B, and HDB_CS. An AND gate 596 also receives as inputs !HDB_M_S_, SEC_DRVSEL, !COPY_PRI_B, and HDB_CS. Finally, an AND gate 598 receives as inputs !HDB_DAK and LHDB_DRQ. The outputs of the AND gates 590, 592, 594, 596 and 598 are presented to the inputs of an OR gate 600. The output of the OR gate 600 is ORed with IDE_RD_, the signal indicating that the IDE port is being read, using an OR gate 601. O_HDA_SEL_ is in turn provided to the direction input of a bi-directional buffer 604. The bi-directional buffer 604 is connected to SD[15:0] at its A input and to HDB_D[15:0] at its B input.

AND gates 578 though 584 are used to decode whether the drive is configured as a master or slave drive; whether the drive is on the primary or secondary channel; whether the drive has been selected; and whether the drive is in the DMA mode. The decoded signals from AND gates 578 to 584 are presented to the OR gate 588 which indicates whether the current interface has been selected via O_HDA_SEL_. When the drive is selected and a read operation is occurring from the IDE port, the data from the drive A interface is routed to the SD bus of the drive which is multiplexed or shared for both IDE functions as well as standard ISA functions. The output of gate 589 is the direction bit to determine which direction the bi-directional buffer is sending data. If O_HDA_SEL is a zero, data is transferred from the B input to the A output. Thus, with separate drive A interface and the drive B interface, OR gates 589 and 601 select the appropriate bidirectional buffers 602 and 604 such that the system data bus cannot be driven from two different sources at the same time.

Figure 11:
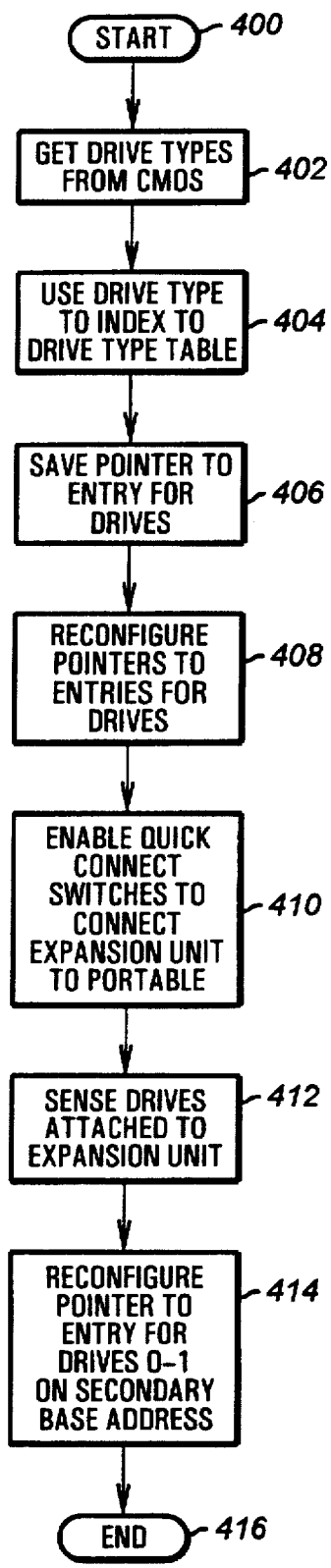
FIG. 11 is a flowchart disclosing the process for remapping drives when the portable computer docks with the expansion base unit.

Turning now to FIG. 11, the process for remapping drives when the portable computer docks with the expansion base unit is illustrated. When the portable computer 80 detects that it is being docked with the expansion base unit 90 in step 400, it first examines the CMOS memory to get drive types in step 402. Next, the drive type information is used to index into the drive type table in step 404. Proceeding to step 406, the pointer to the entries for the drives is stored.

Next, in step 408, the pointers to drive entries is modified so that the drives on the portable computer 80 are mapped as a master drive and a slave drive in channel 1. The expansion base unit 80 then connected to the portable computer in step 410. Next, in step 412, the drives attached to the expansion base unit 90 are sensed and the appropriate drive types retrieved from the CMOS memory. In step 414, the pointer to the entries for the drives on the secondary base address is modified to map the drives on the expansion base unit as a master drive and a slave drive on channel 2. Once this is done, the routine exits in step 416.

Figure 12:
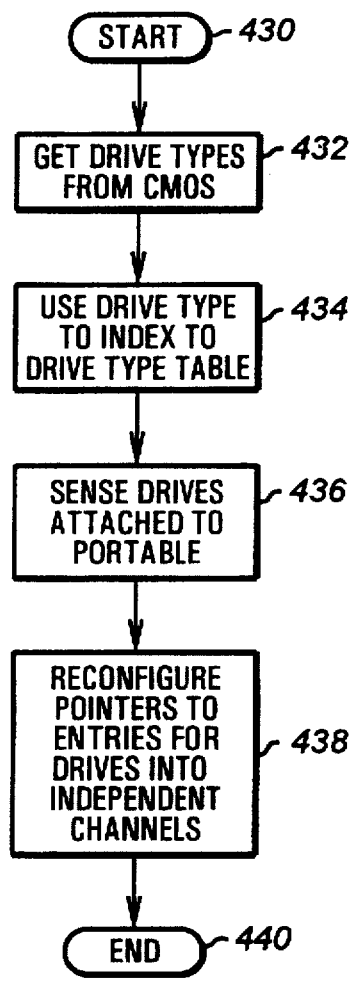
FIG. 12 is a flowchart disclosing the process for remapping drives when the portable computer is separated from the expansion base unit.

Turning now to FIG. 12, the process for remapping drives when the portable computer 80 is separated from the expansion base unit 90 is disclosed. When the portable computer 80 detects that it is separating from the expansion base unit 90 in step 430, it examines the CMOS memory to get drive types in step 432. Next, the drive type information is used to index into the drive type table in step 434. In step 436, the drives attached to the expansion base unit 90 are sensed and the appropriate drive types retrieved from the CMOS memory. Next, in step 438, the pointers to the entries for the drives on the primary and secondary base addresses are modified to map the drives on the portable computer 80 as master drives on channels 1 and 2. Once this is done, the routine exits in step 440.

The thus disclosed dual-master data storage interface flexibly configures and connects data storage drives in a portable computer to optimize performance or accessibility to additional data storage drives located in an expansion unit. Upon detecting a docking sequence between the portable computer and the expansion unit, the second channel is connected to the first channel. Further, the first data storage drive is configured as a master and the second data storage drive is configured as a slave when the portable computer is docked with the expansion unit. Correspondingly, the drives located on the expansion bus are reconfigured and remapped into the remaining channel. Thus, all drives are accessible in a manner that is compatible with the standard BIOS. Upon separation, the channels are isolated and each drive on the portable computer is configured as a master for maximizing stand-alone data transfer performance.

As described above, numerous specific details are set forth such as specific circuits, etc., and specific interface standards such as the Intelligent Drive Electronics (IDE) interface in order to provide a thorough understanding of the present invention. One of ordinary skill in the art will recognize that any number of other drive interfaces with a master-slave arrangement may employ the teachings of the present invention. Further, although the preferred embodiment configures the drives 137 and 139 on the expansion base unit 90 as a master-slave combination to fit onto one channel, the BIOS could instead be modified to accommodate more than two masters, in which case the drives 137 and 139 on the expansion base unit 90 could be configured as master-master drives.

In other instances, well-known circuits, structures, and techniques have not been shown in detail in order not to unnecessarily obscure the present invention. It will be obvious, however, to one skilled in the art that the present invention may be practiced without these specific details.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A device interface adapted to control first and second data storage drives in a portable computer, the portable computer adapted to dock with an expansion unit, each of the drives being adapted to communicate through an interface, with the interface being configurable to address each of the drives as a master or a slave, said interface comprising:

a first channel adapted to control said first data storage drive;

a second channel adapted to control said second data storage drive; and a switching circuit coupling said second data storage drive to said first channel and configuring said first data storage drive as a master and said second data storage drive as a slave when said portable computer is docked with said expansion unit, said switching circuit otherwise decoupling said second data storage drive from the first channel and configuring each of said drives as a master drive.

2. The device interface of claim 1, wherein said first and second channels are Intelligent Drive Electronics channels.

3. The device interface of claim 1, wherein said expansion unit has third and fourth data drives, the third and fourth data drives being configurable respectively as a master and a slave, said interface further comprising:

a third channel respectively adapted to control said third and fourth data storage drives, said third channel coupling said third data storage drive as a master and said fourth data storage drive as a slave to said second channel when said portable computer is docked with said expansion unit.

4. The device interface of claim 3, wherein said third and fourth channels are Intelligent Drive Electronics channels.

5. A computer system, comprising:

a portable computer having first and second data storage drives, each of the drives adapted to being configured as a master device or a slave device;

an expansion unit for receiving said portable computer; and a device interface for controlling the first and second data storage drives, said device interface including:

a first channel adapted to control said first data storage drive;

a second channel adapted to control said second data storage drive; and a switching circuit coupling said second data storage drive to said first channel and configuring said first data storage drive as a master and said second data storage drive as a slave when said portable computer is docked with said expansion unit, said switching circuit otherwise decoupling said second data storage drive from the first channel and configuring said drives as masters.

6. The computer system of claim 5, wherein said first and second data storage drives are Intelligent Drive Electronics drives.

7. The computer system of claim 5, wherein said first data storage drive is a disk drive.

8. The computer system of claim 5, wherein said second data storage drive is a Compact Disc Read Only Memory (CD-ROM) drive.

9. The computer system of claim 5, wherein said first and second channels are Intelligent Drive Electronics channels.

10. The computer system of claim 7, wherein said expansion unit further includes third and fourth data drives, the third and fourth data drives being configurable respectively as a master and a slave, and wherein said device interface further comprises:

a third channel respectively adapted to control said third and fourth data storage drives, said third channel coupling said third data storage drive as a master and said fourth data storage drive as a slave to said second channel when said portable computer is docked with said expansion unit.

11. The computer system of claim 10, wherein said third and fourth data storage drives are Intelligent Drive Electronics drives.

12. The computer system of claim 10, wherein said third data storage drive is a disk drive.

13. The computer system of claim 10, wherein said fourth data storage drive is a Compact Disc Read Only Memory (CD-ROM) drive.

14. The computer system of claim 10, wherein said third and fourth channels are Intelligent Drive Electronics channels.

15. A method for communicating with first and second data storage drives in a portable computer, the portable computer adapted to dock with an expansion unit, each of the drives being configurable as a master drive or a slave drive, each of the drives further adapted to couple to a first channel or a second channel, said method comprising the steps of:

detecting whether said portable computer is docked with said expansion unit;

if said portable computer is docked, coupling said second data storage drive to said first channel and configuring said first data storage drive as a master and said second data storage drive as a slave; and if said portable computer is not docked, coupling said second data storage drive to the second channel and configuring each of said drives as a master drive.

16. The method of claim 15, wherein said expansion unit further includes third and fourth data drives, the third and fourth data drives being configurable respectively as a master drive and a slave drive on one channel, further comprising the step of:

if said portable computer is docked, coupling said third and fourth data storage drives to said second channel and configuring said third data storage drive as a master and said fourth data storage drive as a slave on said second channel.

17. The method of claim 15, wherein said first and second data storage drives are Intelligent Drive Electronics drives.

18. The method of claim 15, wherein said first data storage drive is a disk drive.

19. The method of claim 15, wherein said second data storage drive is a Compact Disc Read Only Memory (CD-ROM) drive.

20. The method of claim 15, wherein said first and second channels are Intelligent Drive Electronics channels.

21. A portable computer system for supporting a mobile user, comprising:

a processor;

a memory coupled to said processor;

a keyboard coupled to said processor for receiving data input from the user;

a display coupled to said processor for providing visual feedback to the user;

first and second data storage drives coupled to said processor for storing data, each of the drives adapted to being configured as a master device or a slave device; and a device interface for controlling the first and second data storage drives, said device interface including:

a first channel adapted to control said first data storage drive;

a second channel adapted to control said second data storage drive; and a switching circuit coupling said second data storage drive to said first channel and configuring said first data storage drive as a master and said second data storage drive as a slave when said portable computer is docked with said expansion unit, said switching circuit otherwise decoupling said second data storage drive from the first channel and configuring said drives as masters.

22. The portable computer system of claim 21 further including an expansion unit for docking, the expansion unit comprising:

third and fourth data drives, the third and fourth data drives being configurable respectively as a master and a slave; and wherein said device interface further comprises:

a third channel adapted to control said third and fourth data storage drives, said third channel coupling said third data storage drive as a master and said fourth data storage drive as a slave to said second channel when said portable computer is docked with said expansion unit.

* * * * *